(12) United States Patent  (10) Patent No.: US 7,699,248 B2
Moriwaki et al.  (45) Date of Patent: Apr. 20, 2010

(54) METHOD FOR RECYCLING WASTE MATERIAL OF THERMOPLASTIC RESIN MOLDED ARTICLE AS RESOURCES

(75) Inventors: Kenji Moriwaki, Hiroshima (JP); Takahiro Tochioka, Hiroshima (JP)

(73) Assignee: Mazda Motor Corporation (JP)

( * ) Notice: Subject to any disclaimer, the term of this patent is extended or adjusted under 35 U.S.C. 154(b) by 114 days.

(21) Appl. No.: 12/013,541

(22) Filed: Jan. 14, 2008

(65) Prior Publication Data
US 2008/0197219 A1  Aug. 21, 2008

(30) Foreign Application Priority Data
Feb. 20, 2007 (JP) .............................. 2007-039170

(51) Int. Cl.
*B02C 19/00* (2006.01)
(52) U.S. Cl. ..................... 241/23; 241/24.14; 241/24.18
(58) Field of Classification Search .............. 241/24.13, 241/24.14, 24.15, 24.18, 19, 25, 23; 264/140, 264/911, 408; 425/135
See application file for complete search history.

(56) References Cited

U.S. PATENT DOCUMENTS

2004/0222541 A1* 11/2004 Moriwaki et al. .......... 264/40.1

FOREIGN PATENT DOCUMENTS

| EP | 1442863 A | 8/2004 |
|---|---|---|
| EP | 1449630 A | 8/2004 |
| EP | 1747870 A | 1/2007 |
| JP | 2002-254430 | 9/2002 |
| JP | 2006-015721 | 1/2006 |
| WO | 2006100381 A | 9/2006 |

OTHER PUBLICATIONS

European Search Report, EP08001072, May 25, 2008.

* cited by examiner

*Primary Examiner*—Mark Rosenbaum
(74) *Attorney, Agent, or Firm*—Studebaker & Brackett PC; Donald R. Studebaker

(57) ABSTRACT

A method for recycling comprises a pulverization step (S1) of pulverizing thermoplastic resin molded articles, each having a different softening point in a resin substrate and having a metal part and a coupling film, a metal-material selection-removal step (S3) of selecting and removing a metal material from pulverized pieces, a pulverized resin-material selection step (S5) of selecting a target pulverized resin material for recycling by allowing the pulverized pieces from which the pulverized metal material has been removed to drop and by ejecting gas towards either one of the target pulverized resin material and a non-target pulverized resin material for changing a drop direction thereof, and a coating-film peeling step (S7) of peeling the coating film from the resin substrate by applying a shearing force to the target pulverized resin material under the softening point of the resin substrate of the target pulverized resin material for recycling.

8 Claims, 9 Drawing Sheets

METHOD FOR RECYCLING WASTE MATERIAL OF THERMOPLASTIC RESIN MOLDED ARTICLE AS RESOURCES

BACKGROUND OF THE INVENTION

The present invention relates to a method for recycling a waste material of a thermoplastic resin molded article as resources.

Conventionally, some bumpers for an automotive vehicle as a waste material have been collected and pulverized, and resin materials for recycling have been obtained from the pulverized bumpers.

Herein, it is generally necessary that metal materials are removed from the pulverized bumper pieces obtained, then target resin materials for recycling are selected from the bumper pieces without the metal materials, and coating films coated on the selected resin materials are peeled from their resin substrates.

Japanese Patent Laid-Open Publication No. 2002-254430 discloses a crasher operative to crash (pulverize) resin molded articles, such as PET bottles, and a centrifugal separator operative to separate specified resin-material pieces from the crashed (pulverized) pieces according to difference in specific gravity thereof.

Japanese Patent Laid-Open Publication No. 2006-15721 discloses a metal selection device operative to select metal-based pieces from crashed pieces of thermoplastic resin molded articles by using magnets, and a mixing tank operative to select target resin-material pieces from the crashed pieces without metal-based pieces according to the specific gravity difference.

Herein, in a case where resin-material pieces still having coating films coated thereon are used as recycling materials, there is a concern that recycled products obtained may provide poor physical properties or poor appearances. The above-described publications disclose no specific treatments of peeling the coating films from substrates of the crashed resin-material pieces.

SUMMARY OF THE INVENTION

The present invention has been devised in view of the above-described matter, and an object of the present invention is to provide a method for recycling a waste material of a thermoplastic resin molded article as resources that can obtain a coating-film-free resin-material as a material for recycling easily and efficiently.

According to the present invention, there is provided a method for recycling a waste material of a thermoplastic resin molded article as resources, comprising a pulverization step of pulverizing a mixture of plural kinds of thermoplastic resin molded articles, each having a different softening point in a resin substrate thereof and having a metal part attached thereto and a coating film coated thereon, a metal-material selection-removal step of selecting and removing a metal material of the pulverized metal part from pulverized pieces obtained through the pulverization step by a selection apparatus, a pulverized resin-material selection step of selecting a target pulverized resin material for recycling by allowing the pulverized pieces from which the pulverized metal material has been removed through the metal-material selection-removal step to drop and by ejecting gas toward either one of the target pulverized resin material for recycling and a non-target pulverized resin material, which are contained in the pulverized pieces dropping, for changing a drop direction thereof, and a coating-film peeling step of peeling the coating film from the resin substrate by applying a shearing force to the target pulverized resin material for recycling that has been selected through the pulverized resin-material selection step under the softening point of the resin substrate of the target pulverized resin material for recycling.

According to the present invention, the metal parts attached to the thermoplastic resin molded articles are pulverized and the metal material of the pulverized metal part is selected and removed from the pulverized pieces by the selection apparatus. Thereby, removal of the metal material can be properly automated and facilitated.

Further, the target pulverized resin material for recycling is selected from the pulverized pieces from which the pulverized metal material has been removed by the gas ejection. Herein, it may be difficult that the gas is ejected toward a specified pulverized resin material in a case where the pulverized pieces are in a lump state. Further, according to the present invention, however, since the pulverized pieces are configured to be allowed to drop, they can be made move smoothly in a certain direction, passing a gas-ejection point without staying, thereby enabling the gas ejection toward the specified pulverized resin material. Thus, any particular devises to provide the smooth moving of the pulverized pieces, such as a conveyer, may not be necessary additionally.

Also, in a case where the metal material is contained in the pulverized pieces dropping, it may be necessary to eject the gas toward the metal material and the non-target pulverized resin material or eject toward the target pulverized resin material in order to select the target pulverized resin material. In this case, since the dropping speeds of the metal material and the pulverized resin material are different to each other, adjusting of timing of the gas ejection may be difficult. According to the present invention, however, since the metal material has been removed through the metal-material selection-removal step, the dropping pulverized pieces consist of the resin material basically and thus the dropping speeds of the pieces becomes substantially the same. Thereby, the adjusting of timing of the gas ejection can be made easier, so that the selection of the target pulverized resin material can be accomplished easily and accurately.

Further, the shearing force is applied to the target pulverized resin material for recycling under the softening point of the resin substrate of the target pulverized resin material. Thereby, since the shearing force is applied when the substrate has been softened enough, the coating film can be surely peeled from the resin substrate. Accordingly, the coating-film-free resin-material as the material for recycling can be obtained easily and efficiently.

Also, if the above-described sheering force was also applied to the non-target pulverized resin material in the coating-film peeling step and the softening pint of the resin substrate of the non-target pulverized resin material was lower than that of the substrate resin of the target pulverized resin material for recycling, the resin substrate of the non-target pulverized resin material would be melted under the temperature of the softening point of the substrate resin of the target pulverized resin material for recycling. This melted resin material would be attached to the surface of the target pulverized resin material for recycling, so that there is a concern that the coating film coated on the resin substrate of the target pulverized resin material might not be peeled properly from the resin substrate. According to the present invention, however, since the non-target pulverized resin material has been already removed in the pulverized resin-material selection step, the above-described concern can be prevented in the coating-film peeling step. Thereby, the coating film coated on the resin substrate can be peeled surely from the resin substrate, so that the coating-film-free resin-material can be obtained further easily and efficiently.

According to an embodiment of the present invention, the coating film is made from a thermosetting material. Thereby, the coating film coated on the resin substrate of the target pulverized resin material for recycling is made in a state where it can be peeled easily from the resin substrate under the softening point in the coating-film peeling step. Accordingly, the coating film coated on the resin substrate of the target pulverized resin material for recycling can be peeled surely. The effects of the present invention can be surely achieved.

According to another embodiment of the present invention, the coating film on the resin substrate is configured to be not softened under the softening point of the resin substrate in the coating-film peeling step. Thereby, the coating film coated on the resin substrate can be peeled further surely. The effects of the present invention can be surely achieved.

According to another embodiment of the present invention, the method further comprising a large-sized waste-material removal step of removing a material that is larger than the metal part from an untreated waste material for recycling, wherein the rest of the waste material for recycling from which the large-sized waste-material has been removed through the large-sized waste-material removal step is supplied to the pulverization step to be pulverized. Thereby, since the larger material than the metal part has been removed from the untreated waste material for recycling in the large-sized waste-material removal step prior to the pulverization step, burdens of apparatuses that work in the respective steps after the pulverization step can be properly lightened.

According to another embodiment of the present invention, the method further comprising a coating-film-free resin-material selection step of selecting the pulverized resin material without the coating film that has been removed through the coating-film peeling step from the pulverized resin material with the coating film. Thereby, since the pulverized resin material without the coating film is selected from the pulverized resin material with the coating film in the coating-film-free resin-material selection step, a collection ratio of the pulverized resin material without the coating film can be further improved.

According to another embodiment of the present invention, the target pulverized resin material for recycling is comprised of plural kinds of pulverized resin materials that have similar softening points of resin substrate to each other. Herein, in a case where the shearing force is applied to the plural kinds of pulverized resin materials under a stepwise-increased temperature within a temperature range that is lower than the highest softening point in the coating-film peeling step, for example, the shearing force may be applied to the pulverized resin materials in a state where the coating film can be easily peeled. Thereby, each of coating films coated on the resin substrates can be properly removed.

According to another embodiment of the present invention, the method further comprising a pulverized resin-material melt step of melting the pulverized resin material without the coating film that has been removed through the coating-film peeling step for obtaining a material for remolding. Thereby, since the material for remolding is obtained by melting the pulverized resin material without the coating film, the superior material for remolding in the physical properties or appearances can be obtained.

According to another embodiment of the present invention, the waste material to be treated by the method is a bumper for an automotive vehicle. Herein, the bumper for an automotive vehicle is generally comprised of the plural kinds of thermoplastic resin molded articles, each having the different softening point in the resin substrate thereof and having the metal part attached thereto and the coating film coated thereon. Accordingly, the effects of the present invention can be properly achieved.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
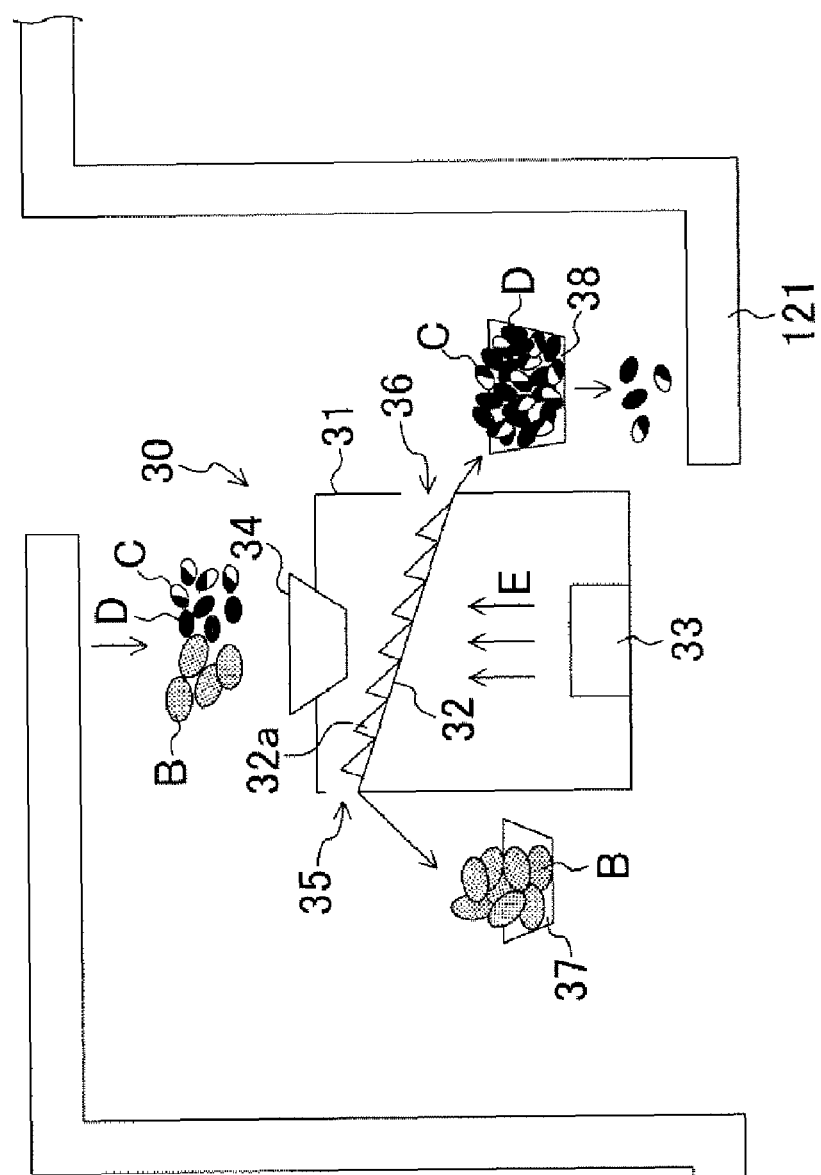
FIG. 1 is a diagram partially showing a system for recycling a waste material of a thermoplastic resin molded article as resources according to the present invention.
Figure 1:
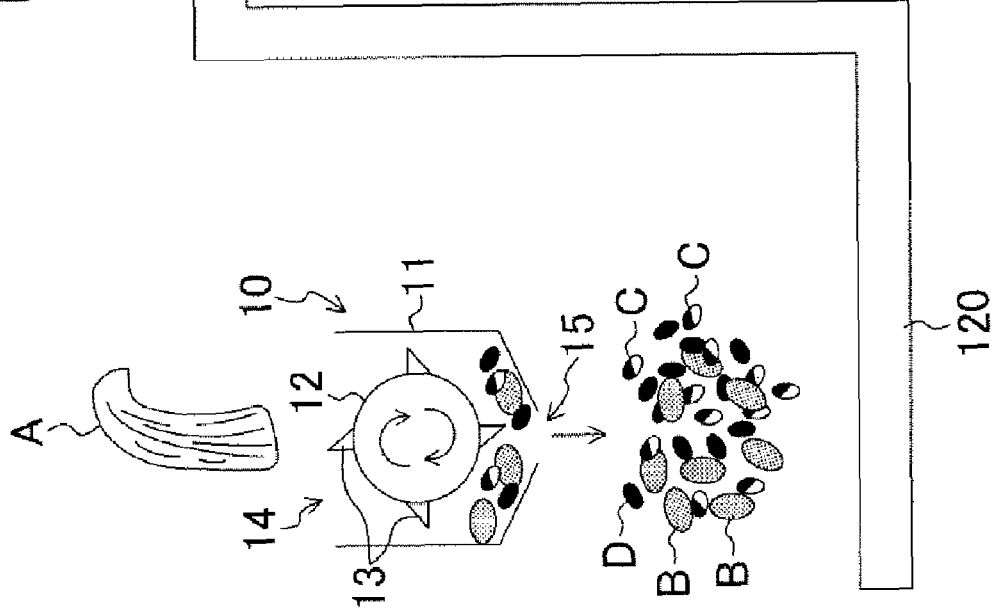
Figure 2:
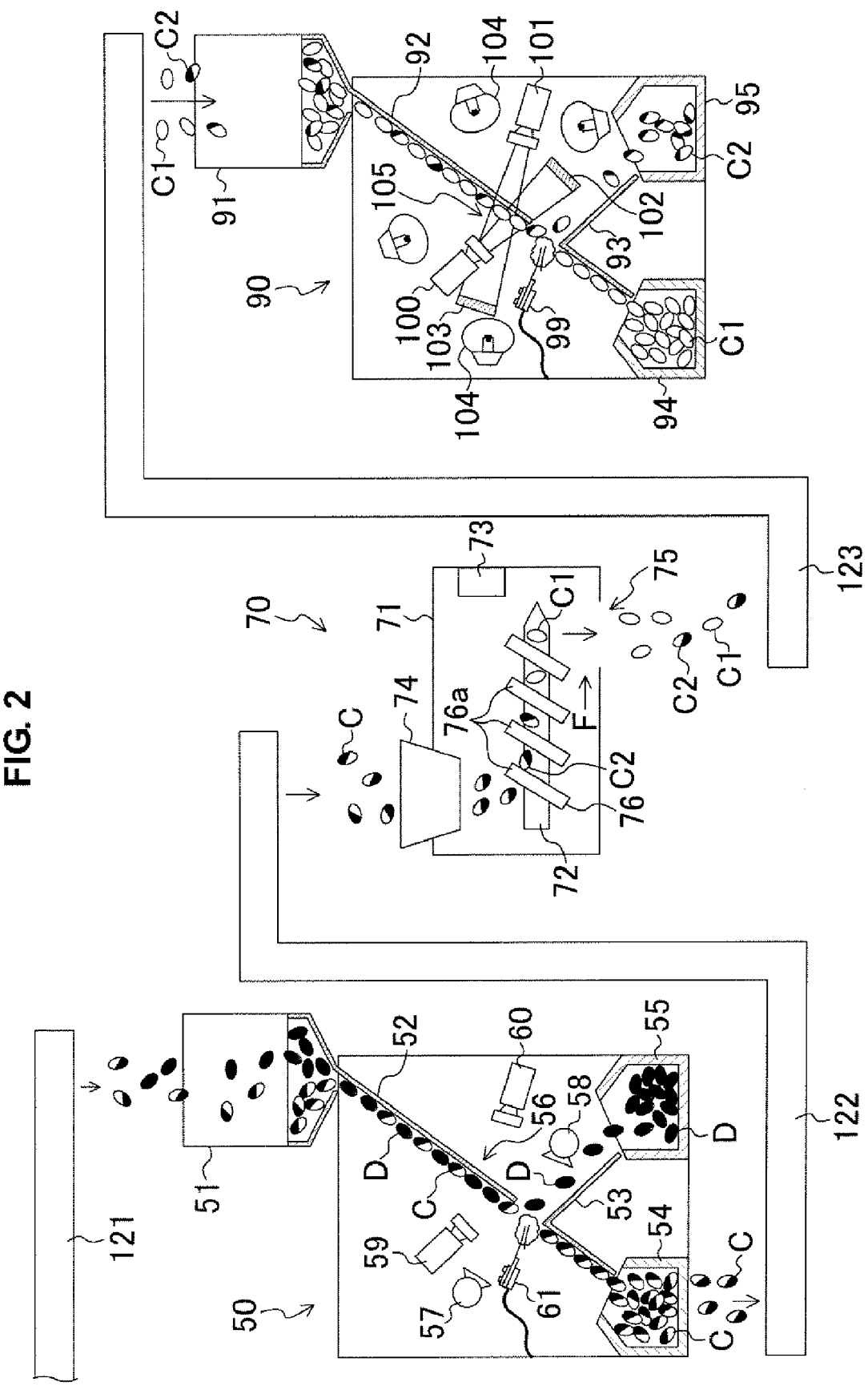
FIG. 2 is another diagram partially showing the system for recycling a waste material of a thermoplastic resin molded article as resources according to the present invention.

FIGS. 1 and 2 are diagrams that partially show a system for recycling a waste material of a thermoplastic resin molded article as resources according to the present invention, respectively.

In the present embodiment, a material to be treated by the system for recycling is used bumper A for an automotive vehicle. The bumper A is comprised of plural kinds of thermoplastic resin molded articles, each having a different softening point in a resin substrate thereof and having a metal part attached thereto, such as a screw, and a coating film coated thereon that is made from a thermosetting material.

The system for recycling comprises, as shown in FIGS. 1 and 2, a pulverization apparatus 10, a metal-material selection apparatus 30, a pulverized material selection apparatus 50, a coating-film peeling apparatus 70, a coating-film-free material selection apparatus 90, and conveyer apparatuses 120, 121, 122, 123.

[Pulverization Apparatus 10]

The pulverization apparatus 10, which pulverizes the bumper A, comprises a pulverization container 11 and a cutter mill 12 that is provided so as to rotate in the container 11. A plurality of rotating edges 13 are formed integrally at a periphery of the cutter mill 12.

An inlet 14 is provided at the top of the pulverization apparatus 10 from which the bumper A is supplied, and an outlet 15 is provided at the bottom from which pulverized pieces of the bumper A are discharged. The bumper A supplied from the inlet 14 is pulverized by the rotating cutter mill 12, and the pulverized pieces of the bumper A are discharged to the outside from the outlet 15.

The pulverized pieces of the bumper A from the pulverization apparatus 10 contain metal materials B of pulverized metal parts, such as screws, pulverized resin materials for recycling C that can be recycled as a material of a bumper remolded article, and other pulverized resin materials D. Coating materials of the above-described coating film are coated (attached) on the pulverized resin materials C, D. Herein, any material that is larger than the above-described metal parts has been removed in advance from the untreated material to be supplied to the above-described pulverization apparatus 10. Thereby, since the respective apparatuses of the system shown in FIGS. 1 and 2, including the pulverization apparatus 10, need not to treat large-sized materials, burdens of these apparatuses can be properly lightened.

[Conveyer Apparatus 120]

The conveyer apparatus 120 coveys the pulverized pieces of the bumper A from the pulverization apparatus 10 to the metal-material selection apparatus 30. The pulverized pieces discharged from the outlet 15 of the pulverization apparatus 10 are conveyed by the conveyer apparatus 120 to a hopper 34, which will be described, of the metal-material selection apparatus 30.

[Metal-Material Selection Apparatus 30]

The metal-material selection apparatus 30 selects and removes the metal materials B from the pulverized pieces of the bumper A. The metal-material selection apparatus 30 comprises a selection container 31, a mesh-shaped belt 32, an air-supply fan (blower) 33, and collection tanks 37, 38.

The belt 32 is provided in the selection container 31 so as to extend between both-side faces of the container. Its extension is provided so as to be inclined as shown, and the belt 32 is configured so that it moves so as to vibrate in a direction of the inclination. An upper face 32a of the belt 32 is formed in a saw shape. Herein, the saw shape is formed in such a manner that an inclination angle of the saw differs between a left (upper) side and a right (lower) side as shown.

The air-supply fan 33 is disposed below the belt 32 so as to provide the air upward, in a direction of an arrow E in FIG. 1.

At the top of the section container 31 is provided the hopper 34. The hopper 34 is located above the belt 32. At both sides of the section container 31 are provided outlets 35, 36 that are respectively located on an extension line of the belt 32. The collection tanks 37, 38 are disposed below the outlets 35, 36 outside the selection container 31.

In the metal-material selection apparatus 30, the pulverized pieces supplied from the hopper 34 drop on and along the belt 32. Herein, the belt 32 vibrates and the fan 33 supplies the air toward the belt 32. The air from the fan 33 passes through meshes of the belt 32 and is blown against the dropped pulverized pieces on the belt 32. The vibration in the slant direction of the belt 32 is applied to the dropped pulverized pieces. As a result, the metal materials B having a relatively high density is brought up to the upper end of the belt 32, while the resin materials C, D having a relatively low density is brought down to the lower end of the belt 32. The metal materials B drop into the collection tank 37 from the outlet 35, and the resin materials C, D drop into the collection tank 38 from the outlet 36. Thus, the mixture of the pulverized resin materials C, D that are obtained by removing the metal materials B from the pulverized pieces is obtained.

[Conveyer Apparatus 121]

The conveyer apparatus 121 coveys the pulverized resin materials C, D that have been obtained through the metal-material selection apparatus 30 to the pulverized material selection apparatus 50. The pulverized pieces collected into the tank 38 of the metal-material selection apparatus 30 are conveyed by the conveyer apparatus 121 to a hopper 51, which will be described, of the pulverized material selection apparatus 50.

[Pulverized Material Selection Apparatus 50]

The pulverized material selection apparatus 50 shown in FIG. 2 selects the pulverized resin materials C from the mixture of the pulverized resin materials C, D. This apparatus 50 comprises the hopper 51 for the pulverized resin materials C, D, a shoot portion 52 to guide the pulverized resin materials C, D dropping in a specified direction, a shoot divergence portion 53 that diverges from a middle portion of the shoot portion 52, and collection tanks 54, 55 to collect the pulverized resin materials C and the pulverized resin materials D separately.

The shoot portion 52 is provided obliquely with a specified inclination angle so as to extend toward the collection tank 54 from the lower of the hopper 51. A portion of the shoot portion 52, which is just above the divergence point of the shoot divergence portion 53, is made of a colorless and transparent material, which constitutes a detection portion 56. Herein, part of the shoot portion 52 that corresponds to the detection portion 56 may be removed, instead of using the colorless and transparent material. That is, an optical image of the pulverized resin materials C, D can be taken through the shoot portion 52.

Further, at the pulverized material selection apparatus 50 are provided infrared-ray emitters 57, 58 operative to emit infrared rays to the pulverized resin materials C, D dropping passing through the detection portion 56 and infrared-ray sensors 59, 60 operative to take infrared photographs of the pulverized resin materials C, D emitting reflection of the infrared rays.

The infrared-ray emitter 57 is disposed on an upper side of the shoot portion 52 at the detection portion 56, and the infrared-ray sensor 59 is disposed on the upper side of the shoot portion 52 so as to receive the reflection at the pulverized resin materials C, D of the infrared rays emitted from the infrared-ray emitter 57.

The infrared-ray emitter 58 is disposed on a lower side of the shoot portion 52 at the detection portion 56, and the infrared-ray sensor 60 is disposed on the lower side of the shoot portion 52 so as to receive the reflection at the pulverized resin materials C, D of the infrared rays emitted from the infrared-ray emitter 58.

Thus, since the infrared-ray sensors 59,60 receive the reflection of the infrared-rays at the pulverized resin materials C, D form plural directions, the reflection can be received accurately regardless of positions of the pulverized resin materials C, D.

Figure 3:
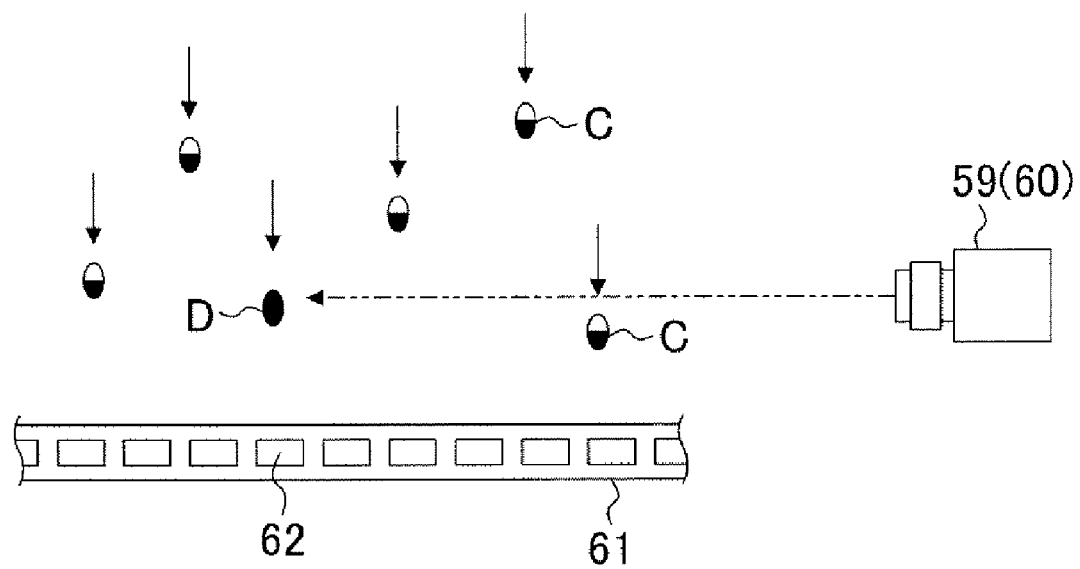
FIG. 3 is a diagram showing an ejection nozzle of an ejector.

Further, at the divergence point of the shoot divergence portion 53 from the shoot portion 52 is provided an ejector 61 to eject air toward the detection portion 56. As shown in FIG. 3, the ejector 61 has a plurality of ejection nozzles 62 along an entire width of a dropping area of the pulverized resin materials C, D.

In the pulverized material selection apparatus 50, the air is blown against the pulverized resin materials D dropping the detection portion 56 based on the taken photos by the infrared-ray sensors 59,60 and thereby the pulverized resin materials D are changed in the direction from the shoot portion 52 to the shoot divergence portion 53. As a result, the pulverized resin materials C drop into the collection tank 54, and the pulverized resin materials D drop into the collection tank 55. Thus, the pulverized resin materials C are selected from the mixture of the pulverized resin materials C, D.

[Conveyer Apparatus 122]

The conveyer apparatus 122 coveys the pulverized resin materials C that have been selected by the pulverized material selection apparatus 50 to the coating-film peeling apparatus 70. The pulverized resin materials C collected into the tank 54 of the pulverized material selection apparatus 50 are conveyed by the conveyer apparatus 122 to a hopper 74, which will be described, of the coating-film peeling apparatus 70.

[Coating-Film Peeling Apparatus 70]

The coating-film peeling apparatus 70, which operates to peel coating films coated on the pulverized resin materials C from the substrates, comprises a cylinder 71, a screw 72 that is provided so as to rotate in the cylinder 71, and a heater 73 to maintain an inner temperature of the cylinder 71 to a specified temperature. Herein, the coating-film peeling apparatus 70 may be comprised of a kneader mixer.

A hopper 74 for supply of the pulverized resin materials C is provided at an end portion of the cylinder 71, and at the other end portion of the cylinder 71 is provided an outlet 75.

Also, screw edges 76 are provided at the peripheral face of the screw 72 so as to extend in an axial direction of the screw with a constant pitch.

The pulverized resin materials C supplied in the cylinder 71 from the hopper are supplied into a space between projections 76a of the screw edges 76 in the coating-film peeling apparatus 70.

Figure 4:
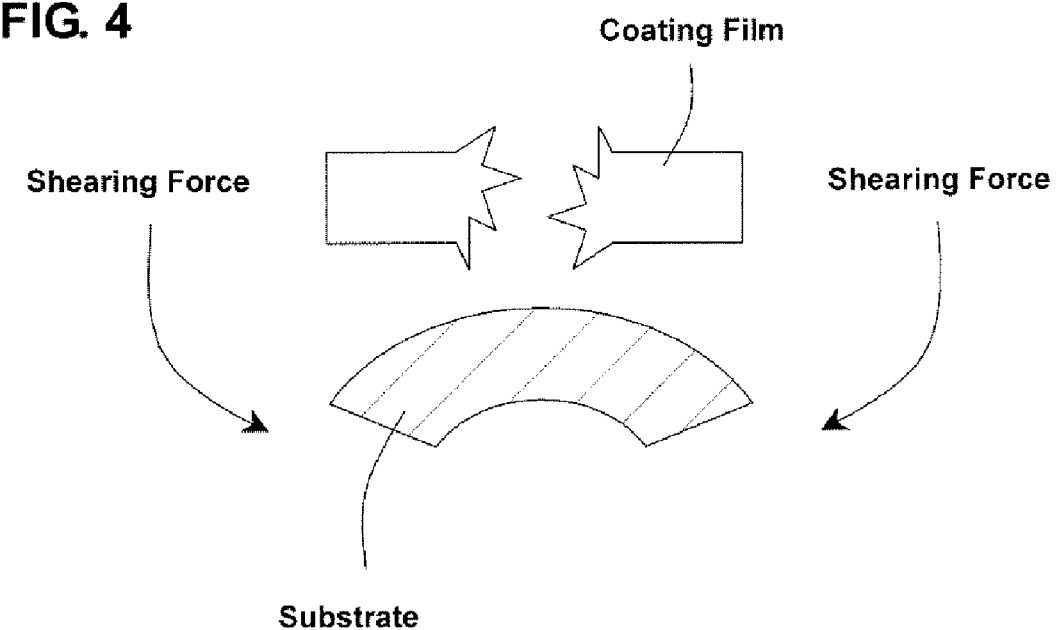
FIG. 4 is a diagram showing a state in which a coating film of a pulverized resin material is removed from a substrate.

Herein, the inner temperature of the cylinder 71 is adjusted and Maintained by the heater 73 to the specified temperature that is a softening point of the substrate of the pulverized resin materials C. Under this softening temperature the coating film on the substrate of the pulverized resin materials C is not softened yet. Thus, the substrate of the pulverized resin materials C is softened, while the coating film is not softened. Accordingly, there is provided a situation where the coating film can be peeled easily from the substrate in the coating-film peeling apparatus 70. Herein, the rotation of the screw 72 causes a shearing force applying to the pulverized resin materials C, so that the coating film can be peeled from the substrate of the pulverized resin materials C as shown in FIG. 4.

The pulverized resin materials C is further conveyed to a direction of an arrow F according to the rotation of the screw 72 and finally discharged from the outlet 75 to the outside of the coating-film peeling apparatus 70. Herein, the pulverized resin materials C discharged from the outlet 75 contains some pulverized resin materials C, coating film of which has not been peeled off and still remains. Hereinafter, the pulverized resin materials C without their coating film (has been peeled off) are referred to as "OK article C1", and the pulverized resin materials C with their coating film (still remain) are referred to as "NG article C2."

[Conveyer Apparatus 123]

The conveyer apparatus 123 coveys the above-described OK articles C1 and NG articles C2 from the coating-film peeling apparatus 70 to the coating film-free material selection apparatus 90. The mixture articles C1, C2 discharged from the outlet 75 are conveyed by the conveyer apparatus 123 to a hopper 91, which will be described, of the coating-film-free material selection apparatus 90.

[Coating-Film-Free Material Apparatus 90]

Figure 5:
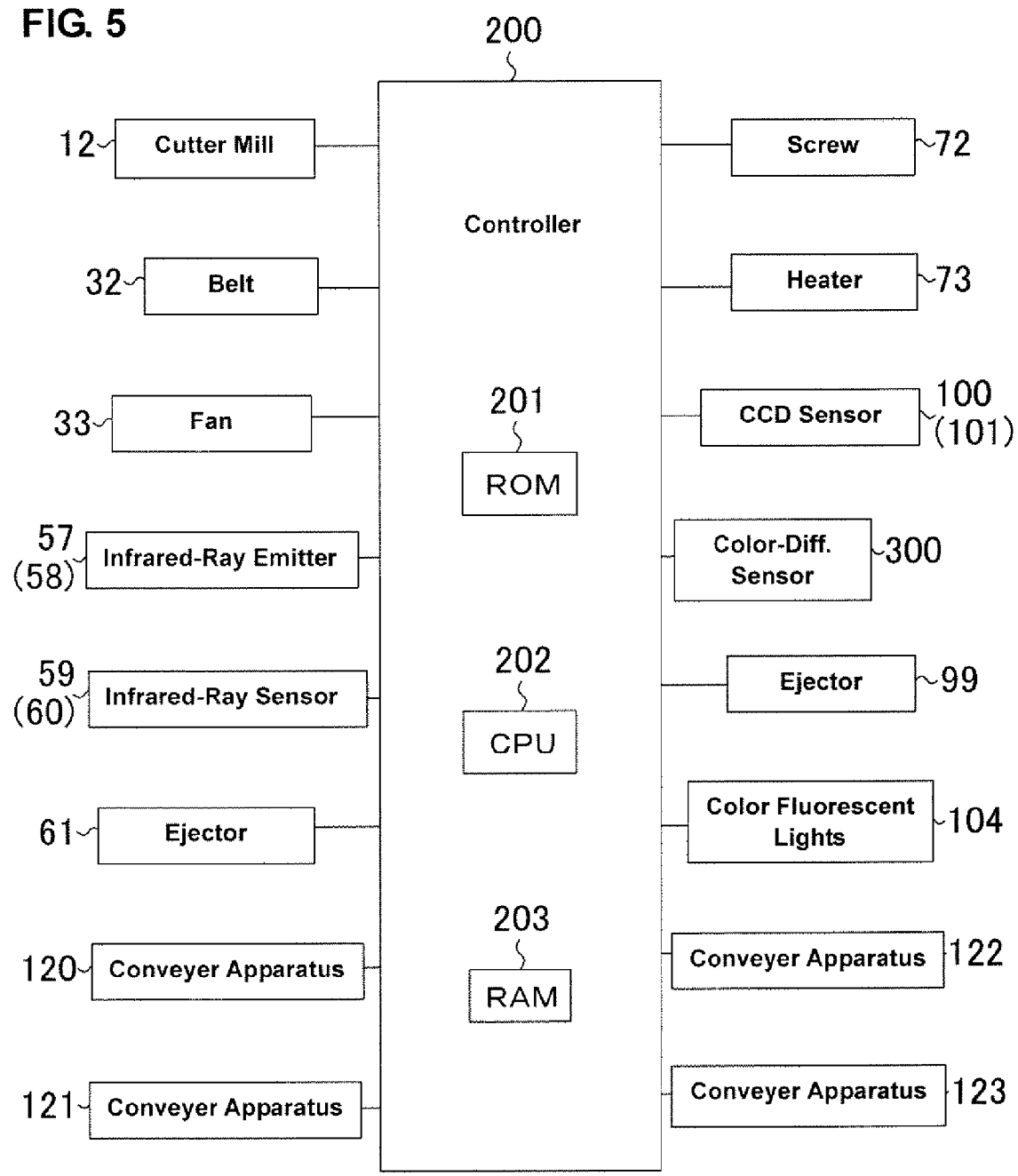
FIG. 5 is a diagram showing a control block of the system for recycling of the present embodiment.

The coating-film-free material selection apparatus 90, which select the OK articles C1 from the mixture of the articles C1, C2, comprises a hopper 91, a shoot portion 92, a shoot divergence portion 93, collection tanks 94, 95, and an ejector 99, which are similar to those of the pulverized material selection apparatus 50. Additionally, the apparatus 90 comprises CCD sensors 100, 101, background members 102, 103, plural color fluorescent lights 104, and color-difference sensor 300, which is shown in FIG. 5. A portion of the shoot portion 92, which is just above the divergence point of the shoot divergence portion 93, is made of a colorless and transparent material, which constitutes a detection portion 105, like the pulverized material selection apparatus 50.

The CCD sensor 100 is disposed on an upper side of the shoot portion 92 at the detection portion 105, and the background member 102 is disposed on the lower side of the shoot portion 92, facing the CCD sensor 100.

The CCD sensor 101 is disposed on the lower side of the shoot portion 92 at the detection portion 105 in such a manner that its light axis crosses the CCD sensor 100 and the background member 102 with a specified angle. The background member 103 is disposed on the upper side of the shoot portion 92, facing the CCD sensor 101.

The background members 102, 103 have a different color from the color of the coating film of the articles C1, C2, such as black, that is put thereon. The CCD sensors 100, 101 can detect the coating film of the NG articles C2 based on color differences in brightness, chroma, or hue between the coating film and the background members 102, 103.

The color-difference sensor 300 detects difference in color between the background members 102, 103 and surfaces of the articles C1, C2 according to the photos taken by the CCD sensors 100, 101. Thus, detection of existence of the coating film by the CCD sensors 100, 101 is executed from plural directions, so that the NG articles C2 can be detected accurately regardless of the position of the articles.

Also, since the CCD sensors 100, 101 detect the coating film of the NG articles C2 based on the color differences in brightness, chroma, or hue between the coating film and the background members 102, 103, any error detection can be prevented properly, thereby improving the coating-film detection accuracy easily and effectively.

The color fluorescent lights 104 are provided near the lenses of the CCD sensors 100, 101. It may be preferable that the color of the color fluorescent lights 104 is green in order to reduce the error detection. The color fluorescent lights 104 may be comprised of a halogen lamp.

In the coating-film-free material selection apparatus 90, the air is blown against the NG articles C2 dropping the detection portion 105 based on the taken photos by the CCD sensors 100,101 and thereby the NG articles C2 are changed in its dropping direction from the shoot portion 92 to the shoot divergence portion 93. As a result, the OK articles C1 drop into the collection tank 94, and the NC articles C2 drop into the collection tank 95. Thus, the OK articles C1 and the NG articles C2 are selected from each other.

FIG. 5 is a diagram showing a control block of the system for recycling of the present embodiment.

A controller 200 in FIG. 5 comprises a ROM 201 that stores a control program for the system for recycling, a CPU 202 that executes processing, which will be described below, according to the program, and a RAM 203 that holds processing results and the like.

The CPU 202 drives the cutter mill 12 of the pulverization apparatus 10 according to the program.

The CPU 202 makes the belt 32 vibrate and drives the fan 33 of the metal-material selection apparatus 30 according to the program.

The CPU 202 drives the program the infrared-ray emitters 57, 58 and controls the ejector 61 based on the sensing signals of the infrared-ray sensors 59, 60 of the pulverized material selection apparatus 50 according to the program.

Also, the CPU 202 drives the screw 72 and operates the heater 73 to keep the inner temperature at the specified setting temperature of the coating-film peeling apparatus 70 according to the program.

Further, the CPU 202 controls the ejector 99 and color fluorescent lights 104 based on the sensing signals of the CCD sensors 100, 101 and color-difference sensor 300 of the coating-film-free material selection apparatus 90 according to the program.

Also, the CPU 202 drives the conveyer apparatuses 120, 121, 122, 123 according to the program.

Figure 6:
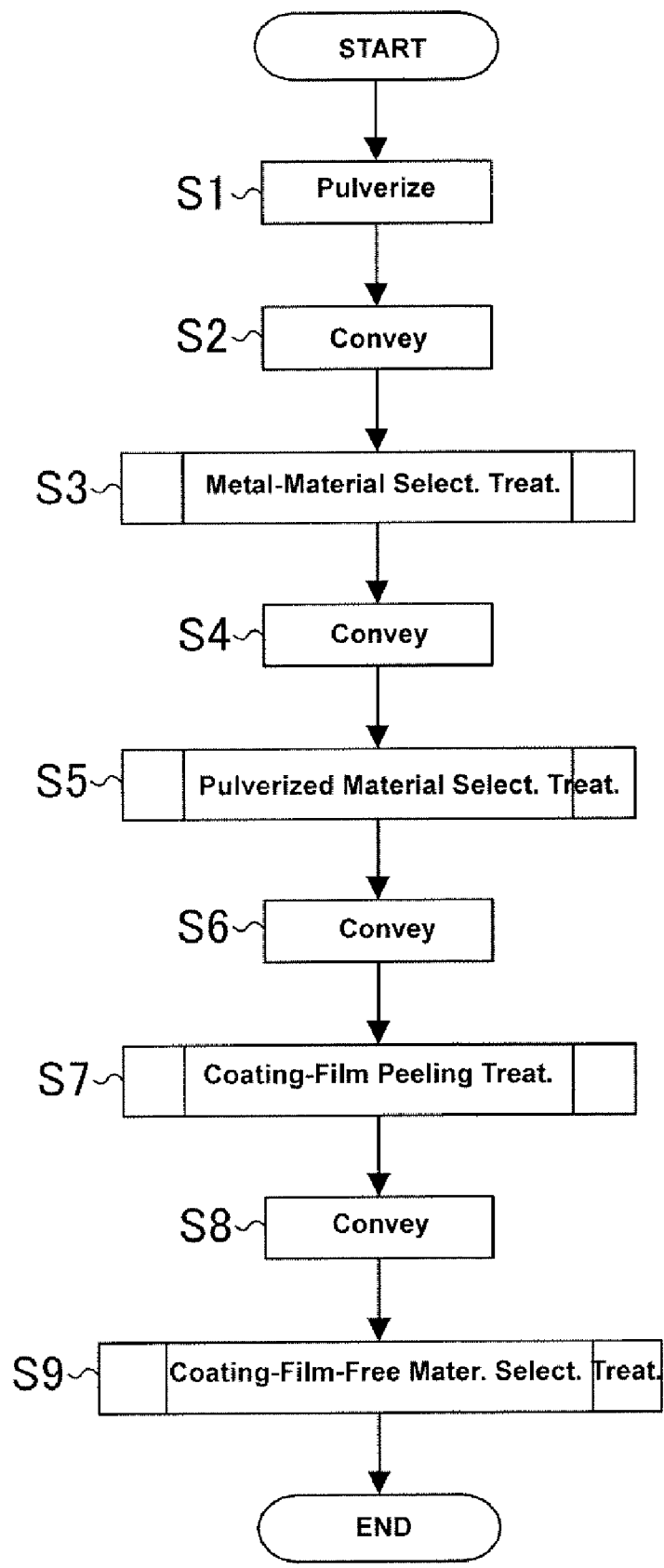
FIG. 6 is a flowchart showing a treatment process that is executed by a CPU in the present embodiment.

FIG. 6 is a flowchart showing the treatment process that is executed by the CPU 202 in the present embodiment.

When the bumper A is supplied into the pulverization container 11 from the inlet 14, the CPU 202 drives the cutter mill 12 and pulverizes the bumper A (step S1).

Next, the CPU 202 drives the conveyer apparatus 120 and thereby the pulverized bumper pieces discharged from the pulverization apparatus 10 are conveyed to the metal-material selection apparatus 30 (step S2).

Figure 7:
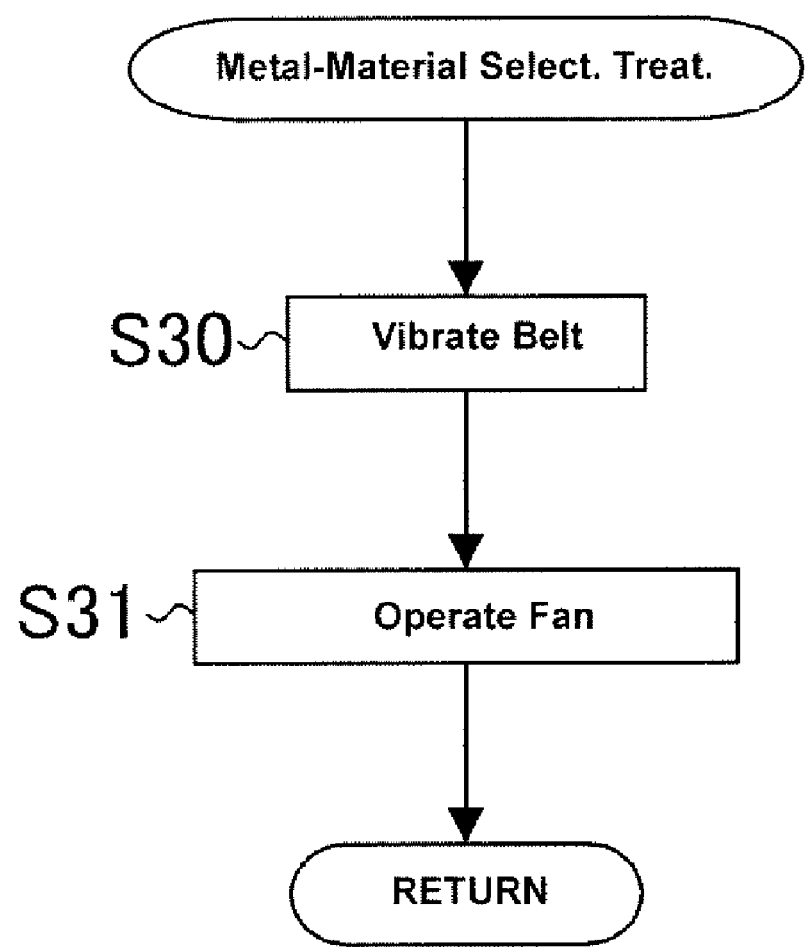
FIG. 7 is a flowchart showing details of a metal-material selection-removal treatment.

Then, the CPU 202 makes the metal-material selection apparatus 30 execute the metal-material selection treatment (step S3). This metal-material selection treatment will be described referring to FIG. 7.

At first, the CPU 202 makes the belt 32 vibrate (step S30) and then makes the air-supply fan 33 operate (step S31).

Returning to FIG. 6, the CPU 202 drives the conveyer apparatus 121 and thereby the mixture of the pulverized resin materials C, D discharged from the metal-material selection apparatus 30 are conveyed to the pulverized material selection apparatus 50 (step S4). Thus, the pulverized resin materials C, D are supplied into the pulverized material selection apparatus 50.

Then, the CPU 202 makes the pulverized material selection apparatus 50 execute the pulverized material selection treatment (step S5). This pulverized material selection treatment will be described referring to FIG. 8.

At first, the CPU 202 makes the infrared-ray emitters 57, 58 and the infrared-ray sensors 59, 60 of the pulverized material selection apparatus 50 operate (step S50), and thereby photos of the pulverized resin materials C, D dropping at the shoot portion 52 are taken at the detection portion 56.

Then, the CPU 202 detects spectral characteristics of the reflected lights from the pulverized resin materials C, D based on the taken photos and then detects a wavelength of an absorption peak of the reflected lights based on the detected spectral characteristics (step S51).

Next, the CPU 202 determines whether the wavelength of absorption peak of the reflected light is within a specified range or not (step S52). When it is determined that it is not within the specified range (NO in the step S52), the pulverized resin material dropping at the detection portion 56 is considered as the pulverized resin materials C, then the control sequence returns to the step S51, without operating the ejector 61. Herein, the pulverized resin materials C dropping at the detection portion 56 are collected into the collection tank 54.

Meanwhile, when it is determined that the wavelength of absorption peak of the reflected light is within the specified range (YES in the step S52), the pulverized resin material dropping at the detection portion 56 is considered as the pulverized resin materials D, then the ejection nozzle 62 of the ejector 61 are decided (step S53). That is, the specified ejection nozzle 62 that corresponds to the dropping position of the pulverized resin materials D is selected from the plural ejection nozzles 62 shown in FIG. 3.

Next, the CPU 202 operates the ejector 61 to blow the air from the ejection nozzle 62 against the pulverized resin materials D at their dropping timing so that the dropping direction of the pulverized resin materials D is changed toward the shoot divergence portion 53 (step S54). Thereby, the pulverized resin materials D are collected into the collection tank 55.

Subsequently, the CPU 202 determines whether all of the pulverized resin materials C, D supplied in the step S4 have dropped or not (step S55). When all of them have not dropped yet (NO in the step S55), the processing from the step S51 continues until all of them have dropped.

Figure 8:
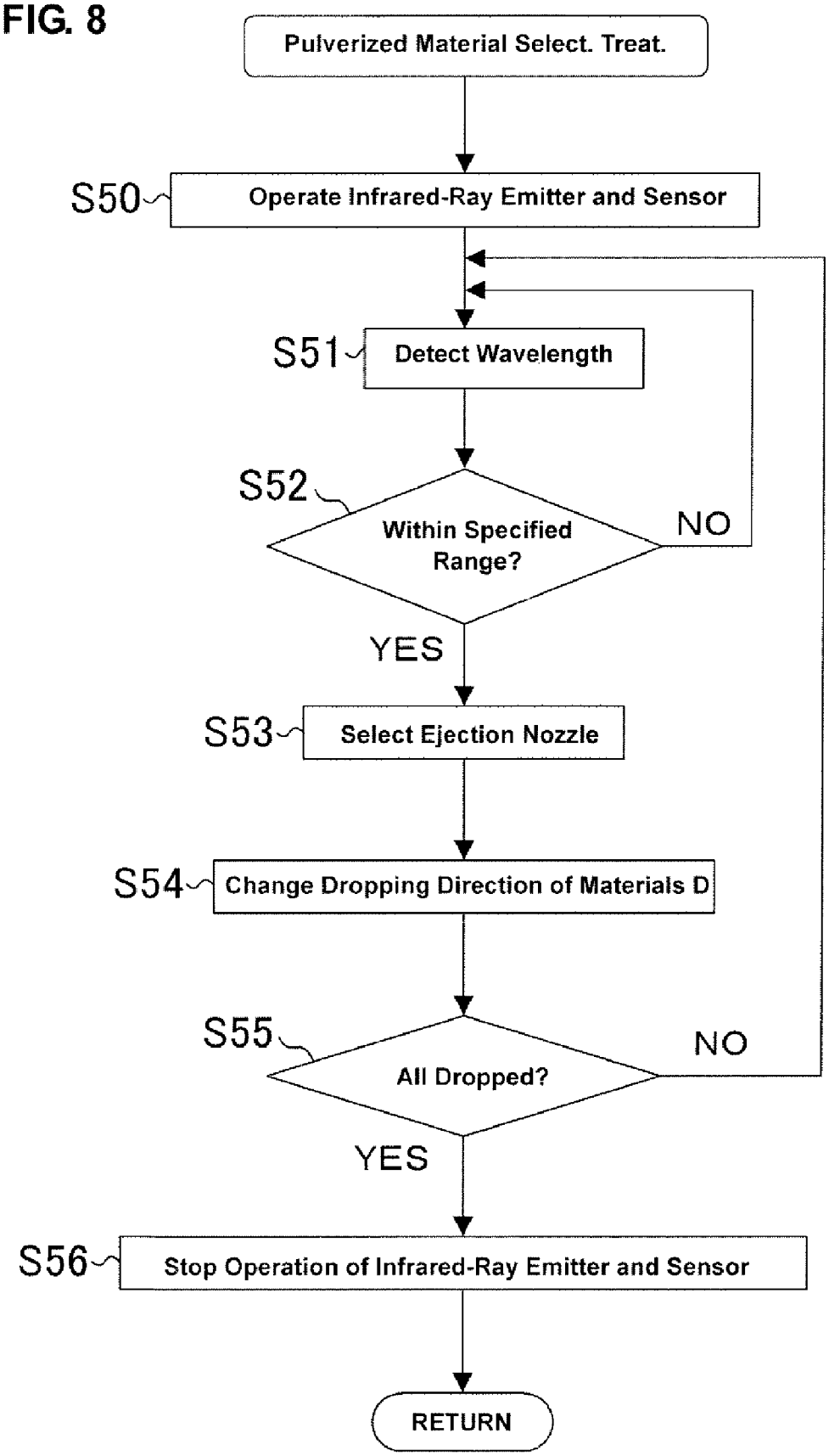
FIG. 8 is a flowchart showing details of a pulverized material selection treatment.

Meanwhile, when all of pulverized resin materials C, D have dropped (YES in the step S55), the CPU 202 stops operations of the infrared-ray emitters 57, 58 and the infrared-ray sensors 59, 60 (step S56). After the step S56 has been executed, the pulverized resin-material selection treatment shown in FIG. 8 is complete.

Returning to FIG. 6, the CPU. 202 drives the conveyer 122 and thereby the pulverized resin materials C collected into the collection tank 54 are conveyed to the coating-film peeling apparatus 70 (step S6). Thereby, the pulverized resin materials C are supplied to the coating-film peeling apparatus 70.

Figure 9:
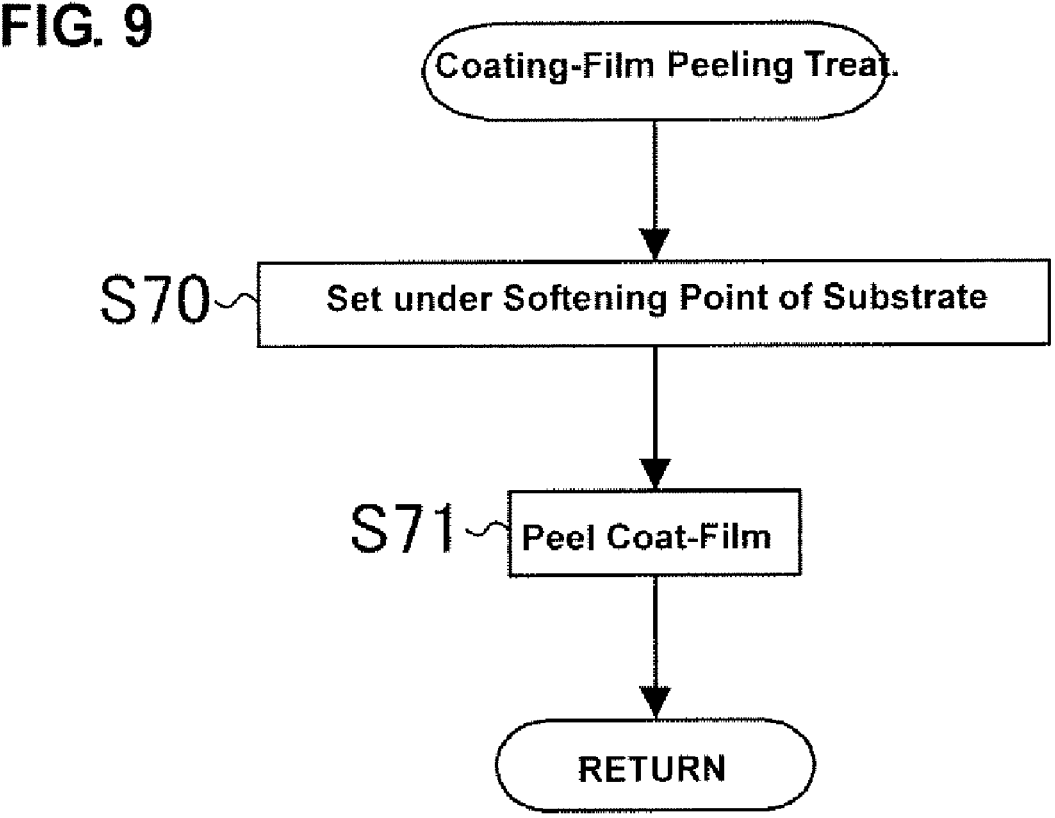
FIG. 9 is a flowchart showing details of a coating-film peeling treatment.

Next, the CPU 202 makes the coating-film peeling apparatus 70 execute the coating-film peeling treatment (step S7). The coating-film peeling treatment will be described referring to FIG. 9.

First, the CPU 202 operates the heater 73 to set the inner temperature of the cylinder to the softening point of the substrate of the pulverized resin materials C (step S70).

Then, the CPU 202 drives the screw 72 for a specified term and thereby the coating film is peeled from the substrate of the pulverized resin materials C (step S71).

Returning to FIG. 6, the CPU 202 drives the conveyer 123 and thereby the pulverized resin materials C discharged from the coating-film peeling apparatus 70 are conveyed to the coating-film-free material selection apparatus 90 (step S8). Thereby, the pulverized resin materials C are supplied to the coating-film-free material selection apparatus 90.

Figure 10:
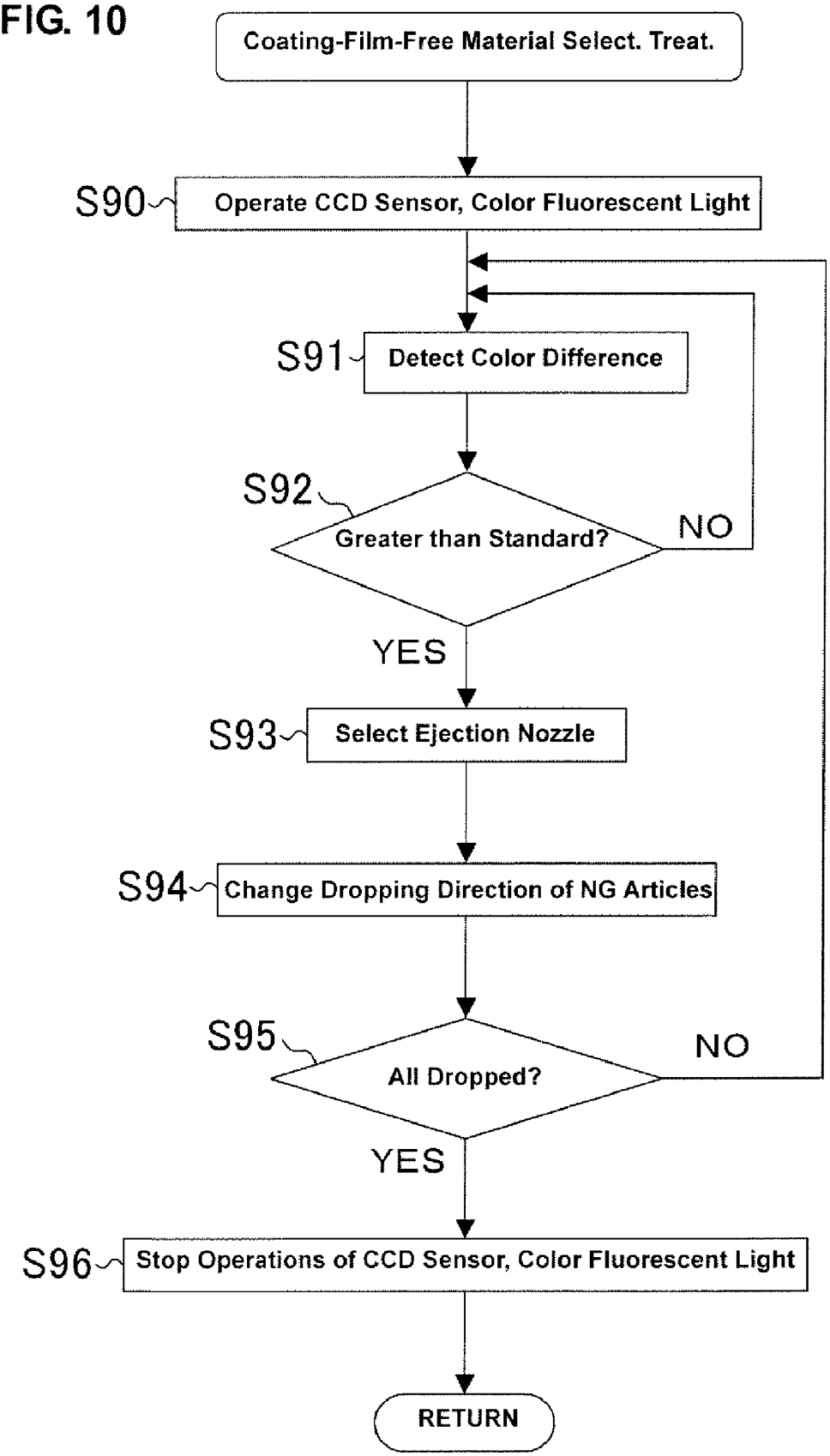
FIG. 10 is a flowchart showing details of a coating-film-free resin-material selection treatment.

Next, the CPU 202 makes the coating-film-free material selection apparatus 90 execute the coating-film-free material selection treatment (step S9). The coating-film-free material selection treatment will be described referring to FIG. 10.

First, the CPU 202 operates the CCD sensors 100, 101 and the color fluorescent lights 104 (step S90), and thereby the photos of the pulverized resin materials C dropping on the shoot portion 92 are taken at the detection portion 105.

Next, the CPU 202 makes the color-difference sensor 300 detect difference in color (step S91).

Then, the CPU 202 compares the detected color difference with a standard value and it is determined whether the detected color difference is greater than the standard value or not (step S92). When the detected color difference is lower than the standard value (NO in the step S92), the pulverized resin materials C dropping at the detection portion 105 is considered as the OK articles C1 and the control sequence returns to the step S91, without operating the ejector 99. The OK articles C1 are collected into the collection tank 94 from the shoot portion 92.

Meanwhile, when the detected color difference is the standard value or more (YES in the step S92), the pulverized resin materials C dropping at the detection portion 105 is considered as the NG articles C2 and the specified ejection nozzle corresponding to the dropping position of the NG articles C2 is selected as the nozzle to eject the air (step S93).

Then, the CPU 202 makes the ejector 99 eject the air from the selected ejection nozzle at the dropping timing of the NG articles C2, and thereby the dropping direction of the NG articles C2 is charged to the shoot divergence portion 93 (step S94). Thereby, the NG articles C2 are collected into the collection tank 95.

Subsequently, the CPU 202 determines whether all of the pulverized resin materials C supplied in the step S8 have dropped or not (step S95). When all of them have not dropped yet (NO in the step S95), the processing from the step S91 continues until all of them have dropped.

Meanwhile, when all of pulverized resin materials C have dropped (YES in the step S95), the CPU 202 stops operations of the CCD sensors 100, 101 and the color fluorescent lights 104 (step S96).

According to the present embodiment, the metal parts attached to the thermoplastic resin molded articles of the bumper A are pulverized and the metal material of the pulverized metal part is selected and removed from the pulverized pieces by the metal-material selection apparatus 30. Thereby, removal of the metal material can be properly automated and facilitated.

Further, in the pulverized material selection apparatus 50 the pulverized pieces C, D are configured to be allowed to drop and pass through the divergence point of the shoot portion 52 and the shoot divergence portion 53 where the air is ejected. Thus, any particular devises to make the pulverized pieces C, D pass through the air-ejection point, such as the conveyer, may not be necessary additionally.

Also, since the metal material B has been removed in the metal-material selection apparatus 30, the dropping pulverized pieces consist of the resin material basically in the pulverized material selection apparatus 50 and thus the dropping speed of the pieces becomes substantially the same. Thereby, the adjusting of timing of the air ejection can be easy, so that the selection of the pulverized resin materials C can be accomplished easily and accurately.

Further, the shearing force is applied to the pulverized resin materials C under the softening point of the resin substrate of the pulverized resin materials C. Thereby, since the sheering force is applied when the substrate has been softened, the coating film can be surely peeled from the resin substrate of the pulverized resin materials C. Accordingly, the coating-film-free resin-material as the material for recycling can be obtained easily and efficiently.

Herein, if the pulverized resin materials D were also supplied into the coating-film peeling apparatus 70 and the softening pint of the resin substrate of the pulverized resin materials D was lower than that of the substrate resin of the pulverized resin materials C, the resin substrate of the pulverized resin materials D would be melted under the temperature of the softening point of the substrate resin of the pulverized resin materials C. This melted resin material would be attached to the surface of the pulverized resin materials C, so that there is a concern that the coating film coated on the resin substrate of the pulverized resin materials C might not be peeled properly from the resin substrate. According to the present invention, however, since the pulverized resin materials D has been already removed in the pulverized material selection apparatus 50 and only the pulverized resin materials C are supplied to the coating-film peeling apparatus 70, the above-described concern can be prevented. Thereby, the coating film coated on the resin substrate of the pulverized resin materials C can be peeled surely from the resin substrate, so that the coating-film-free resin-material can be obtained further easily and efficiently.

Also, since the coating film of the pulverized resin materials C is made from the thermosetting material, the coating film coated on the resin substrate of the pulverized resin materials C is made in a state where it can be peeled easily from the resin substrate under the softening point in the coating-film peeling treatment. Accordingly, the coating film coated on the resin substrate of the pulverized resin materials C can be peeled surely.

Further, since the coating film on the resin substrate of the pulverized resin materials C is configured to be not softened under the softening point of the resin substrate in the coating-film peeling treatment, the coating film coated on the resin substrate can be peeled further surely.

Also, since the larger material than the metal part has been removed from the untreated waste material for recycling prior to the pulverization treatment, burdens of apparatuses that work in the respective steps after the pulverization step can be properly lightened.

Further, since the pulverized resin material without the coating film (OK articles C1) is selected from the pulverized resin material with the coating film (NG articles C2) in the coating-film-free resin-material selection treatment, a collection ratio of the pulverized resin material without the coating film can be further improved.

The present invention should not be limited to the above-described embodiment, and any other modifications and improvements may be applied in the scope of a spirit of the present invention.

For example, the pulverized resin materials C is comprised of plural kinds of pulverized resin materials that have similar softening points to each other. In this case, there is provided a conveyer apparatus to convey the pulverized resin materials C discharged from the outlet 75 to the hopper 74 again for the coating-film peeling apparatus 70 shown in FIG. 2.

In this case, the CPU 202 drives the screw 72 at a state where the inner temperature of the cylinder 71 is set at the lowest softening point of the substrate when the pulverized resin materials C conveyed from the pulverized material selection apparatus 50 are supplied into the cylinder 71 from the hopper 74. Thereby, the coating film of the pulverized resin materials having the lowest softening point of the substrate is peeled from the substrate.

Next, the CPU 202 drives the above-described conveyer apparatus. Thereby, the pulverized resin materials C discharged from the outlet 75 are supplied into the cylinder 71 through the hopper 74.

Then, the CPU 202 sets the inner temperature of the cylinder 71 at the second lowest softening point of the substrate and drives the screw 72. Thereby, the coating film of the pulverized resin materials having the second lowest softening point of the substrate is peeled from the substrate.

Thus, the inner temperature of the cylinder 71 is increased stepwise up to the highest softening point of the substrate of the pulverized resin materials, and the treatment of the above-described coating-film peeling is repeated at each time of the stepwise increase of the temperature. Thereby, the coating films of all of the pulverized resin materials are peeled from their substrates.

Also, there may be provided a treatment of melting the pulverized resin materials C without the coating film that has been removed after the coating-film-free material selection treatment by the coating-film-free material selection apparatus 90. Thereby, since the material for remolding is obtained by melting the pulverized resin materials C without the coating film, the superior material for remolding in the physical properties or appearances can be obtained. In this case, a melting apparatus for the melting treatment and a conveyer apparatus from the coating-film-free material selection apparatus 90 to the melting apparatus are added to the system. The CPU 202 drives this conveyer to covey the pulverized resin materials C without the coating film from the coating-film-free material selection apparatus 90 to the melting apparatus and drives the melting apparatus to melt the pulverized resin materials C.

What is claimed is:

1. A method for recycling a waste material of a thermoplastic resin molded article as resources, comprising:
    a pulverization step of pulverizing a mixture of plural kinds of thermoplastic resin molded articles, each having a different softening point in a resin substrate thereof and having a metal part attached thereto and a coating film coated thereon;
    a metal-material selection-removal step of selecting and removing a metal material of the pulverized metal part from pulverized pieces obtained through said pulverization step by a selection apparatus;
    a pulverized resin-material selection step of selecting a target pulverized resin material for recycling by allowing the pulverized pieces from which the pulverized metal material has been removed through said metal-material selection-removal step to drop and by ejecting gas toward either one of the target pulverized resin material for recycling and a non-target pulverized resin material, which are contained in the pulverized pieces dropping, for changing a drop direction thereof; and
    a coating-film peeling step of peeling the coating film from the resin substrate by applying a shearing force to the target pulverized resin material for recycling that has been selected through said pulverized resin-material selection step under the softening point of the resin substrate of the target pulverized resin material for recycling.

2. The method for recycling a waste material of a thermoplastic resin molded article as resources of claim 1, wherein said coating film is made from a thermosetting material.

3. The method for recycling a waste material of a thermoplastic resin molded article as resources of claim 1, wherein the coating film on the resin substrate is configured to be not softened under the softening point of the resin substrate in said coating-film peeling step.

4. The method for recycling a waste material of a thermoplastic resin molded article as resources of claim 1, the method further comprising a large-sized waste-material removal step of removing a material that is larger than the metal part from an untreated waste material for recycling, wherein the rest of the waste material for recycling from which the large-sized waste-material has been removed through said large-sized waste-material removal step is supplied to said pulverization step to be pulverized.

5. The method for recycling a waste material of a thermoplastic resin molded article as resources of claim 1, the method further comprising a coating-film-free resin-material selection step of selecting the pulverized resin material without the coating film that has been removed through said coating-film peeling step from the pulverized resin material with the coating film.

6. The method for recycling a waste material of a thermoplastic resin molded article as resources of claim 1, wherein the target pulverized resin material for recycling is comprised of plural kinds of pulverized resin materials that have similar softening points of resin substrate to each other.

7. The method for recycling a waste material of a thermoplastic resin molded article as resources of claim 1 the method further comprising a pulverized resin-material melt step of melting the pulverized resin material without the coating film that has been removed through said coating-film peeling step for obtaining a material for remolding.

8. The method for recycling a waste material of a thermoplastic resin molded article as resources of claim 1, wherein the waste material to be treated by the method is a bumper for an automotive vehicle.

* * * * *